United States Patent
Kim

(10) Patent No.: US 9,136,555 B2
(45) Date of Patent: Sep. 15, 2015

(54) RECHARGEABLE BATTERY

(75) Inventor: Duk-Jung Kim, Yongin-si (KR)

(73) Assignees: SAMSUNG SDI CO., LTD., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 380 days.

(21) Appl. No.: 13/343,238

(22) Filed: Jan. 4, 2012

(65) Prior Publication Data

US 2012/0282502 A1    Nov. 8, 2012

Related U.S. Application Data

(60) Provisional application No. 61/481,550, filed on May 2, 2011.

(51) Int. Cl.
| | |
|---|---|
| *H01M 2/06* | (2006.01) |
| *H01M 10/04* | (2006.01) |
| *H01M 2/22* | (2006.01) |
| *H01M 2/26* | (2006.01) |
| *H01M 2/30* | (2006.01) |
| *H01M 2/34* | (2006.01) |
| *H01M 2/02* | (2006.01) |
| *H01M 2/12* | (2006.01) |

(52) U.S. Cl.
CPC ............... *H01M 10/04* (2013.01); *H01M 2/06* (2013.01); *H01M 2/22* (2013.01); *H01M 2/266* (2013.01); *H01M 2/30* (2013.01); *H01M 2/34* (2013.01); *H01M 10/0413* (2013.01); *H01M 2/0217* (2013.01); *H01M 2/12* (2013.01); *H01M 10/0463* (2013.01); *H01M 2220/20* (2013.01)

(58) Field of Classification Search
CPC ... H01M 2/00; H01M 2200/00; H01M 2200/20
USPC ............. 429/163–187, 148–160, 61, 82, 211
See application file for complete search history.

(56) References Cited

U.S. PATENT DOCUMENTS

| | | | |
|---|---|---|---|
| 6,248,470 B1 * | 6/2001 | Azema et al. ................ | 429/61 |
| 6,899,972 B2 * | 5/2005 | Cho ............................. | 429/61 |
| 2006/0019158 A1 * | 1/2006 | Mori et al. ................... | 429/174 |
| 2008/0038627 A1 | 2/2008 | Yamauchi et al. | |

(Continued)

FOREIGN PATENT DOCUMENTS

| | | |
|---|---|---|
| CN | 1412876 | 4/2003 |
| EP | 1300893 A2 | 4/2003 |

(Continued)

OTHER PUBLICATIONS

Chinese Office Action dated Apr. 27, 2015.

*Primary Examiner* — Jonathan Jelsma
*Assistant Examiner* — Rashid Alam
(74) *Attorney, Agent, or Firm* — Lee & Morse, P.C.

(57) ABSTRACT

A rechargeable battery includes a case, an electrode assembly in the case, at least one terminal portion disposed at least partially inside the case, at least one current collecting member electrically connecting the electrode assembly and the terminal portion, the current collecting member including a terminal coupling portion, and at least one insulation member in the case. The insulation member includes a current collecting member coupling portion into which the terminal coupling portion extends. The current collecting member coupling portion supports at least a portion of the terminal coupling portion.

14 Claims, 9 Drawing Sheets

(56) References Cited

U.S. PATENT DOCUMENTS

2009/0186269 A1* 7/2009 Kim et al. .................... 429/179
2011/0183165 A1* 7/2011 Byun et al. .................... 429/61
2012/0070704 A1* 3/2012 Jung et al. ..................... 429/53
2012/0107652 A1* 5/2012 Iyori et al. ..................... 429/61
2012/0114979 A1* 5/2012 Kim et al. ....................... 429/7
2012/0251874 A1* 10/2012 Guen ............................ 429/179
2012/0264008 A1* 10/2012 Okamoto et al. ............. 429/182

FOREIGN PATENT DOCUMENTS

| EP | 2254176 A1 | 11/2010 |
| JP | 2010-199029 | 9/2010 |
| KR | 10-1999-0074762 A | 10/1999 |

* cited by examiner

RECHARGEABLE BATTERY

CROSS-REFERENCE TO RELATED APPLICATION

The present application claims priority under 35 U.S.C. §119(e) to U.S. Provisional Application No. 61/481,550, filed on May 2, 2011, and entitled: "Rechargeable Battery," which is incorporated herein by reference in its entirety.

BACKGROUND

1. Field

Embodiments disclosed herein relate to a rechargeable battery, and more particularly, to a rechargeable battery that has an improved structure of a lower insulation member.

2. Description of the Related Art

Unlike a primary battery, which cannot be recharged, a rechargeable battery can be recharged and discharged. Low capacity rechargeable batteries are used for small portable electronic devices such as mobile phones, laptop computers, and camcorders, while high capacity batteries are used as motor driving power sources for hybrid vehicles, etc. or used as high capacity power storage devices.

A high-output rechargeable battery using a non-aqueous electrolyte having high energy density has been recently developed. The high-output rechargeable battery is formed as a large capacity battery module by connecting a plurality of rechargeable batteries in series to be used for driving a motor for an apparatus requiring a large amount of power, e.g., electrical vehicle. The rechargeable battery of this type may be formed in a cylindrical shape or a prismatic shape.

The above information disclosed in this Background section is only for enhancement of understanding of the background of the invention and therefore it may contain information that does not form the prior art that is already known in this country to a person of ordinary skill in the art.

SUMMARY

According to an exemplary embodiment, there is provided a rechargeable battery, including a case, an electrode assembly in the case, at least one terminal portion disposed at least partially inside the case, at least one current collecting member electrically connecting the electrode assembly and the terminal portion, the current collecting member including a terminal coupling portion; and at least one insulation member in the case, wherein the insulation member includes a current collecting member coupling portion into which the terminal coupling portion extends. The current collecting member coupling portion supports at least a portion of the terminal coupling portion.

The insulation member may include a body portion adjacent to the current collecting member coupling portion.

The body portion may include a groove in which the terminal coupling portion is received.

The terminal portion may engage the terminal coupling portion of the current collecting member inside the groove.

The current collecting member coupling portion may include an opening between the groove and an outside of the insulation member, and through which the terminal coupling portion insertably extends.

A boundary of the groove may have a predetermined shape. The terminal portion may include a flange having a perimeter with a shape corresponding to the predetermined shape of the boundary of the groove, the flange being in insertable engagement with the groove.

The terminal coupling portion may include a terminal coupling hole that engages a coupling protrusion extending from the terminal portion.

The current collecting member coupling portion may be coupled to a plate that forms a bottom surface of the current collecting member coupling portion of the insulation member.

The current collecting member coupling portion and the plate may be coupled by force-fit engagement of corresponding projections and holes on the current collecting member coupling portion and the plate.

The terminal coupling portion may include a fuse portion having a smaller cross-sectional area than other portions of the terminal coupling portion, the fuse portion being supported by the current collecting member coupling portion of the insulation member.

The fuse portion may include a fuse hole.

The insulation member may include gas exhaust paths.

The gas exhaust paths may include a first gas exhaust flow path between a lateral side of the insulation member and an end portion of the insulation member.

The first gas exhaust path may include a gas exhaust passage through the lateral side of the insulation member and a gas exhaust port at the end portion of the insulation member.

The gas exhaust paths may include a pair of first gas exhaust flow paths between a pair of respective lateral sides of the insulation member and an end portion of the insulation member.

The gas exhaust paths may include a second gas exhaust flow path at an upper surface of the insulating member. The second gas exhaust flow path may include one or more gas flow slots that extend across the upper surface of the insulating member.

The at least one terminal portion may include first and second terminal portions. The at least one current collecting member may include first and second current collecting members. The at least one insulation member may include first and second insulation members.

According to another exemplary embodiment, there is provided a current collector-terminal assembly including a current collecting member that includes an electrode coupling portion and a terminal coupling portion, a terminal member, and an insulation member including a current collecting member coupling portion into which the terminal coupling portion extends. The current collecting member coupling portion supports at least a portion of the terminal coupling portion and the insulation member including a body portion having groove in which the current collecting member coupling portion is received. The terminal coupling portion is insertably received in an opening of the current collecting member coupling portion of the insulation member and extends into the groove and the terminal member is fixed in the groove such that the terminal member engages the terminal coupling portion.

The terminal coupling portion may include a fuse portion having a smaller cross-sectional area than other portions of the terminal coupling portion. The fuse portion may be supported by the current collecting member coupling portion of the insulation member.

The insulation member may include at least one of a first gas exhaust flow path extending between a lateral side of the insulation member and an end portion of the insulation member and a second gas exhaust flow path at a upper surface of the insulating member, the second gas exhaust flow path including one or more gas flow slots that extend across the upper surface of the insulating member.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Figure 1:
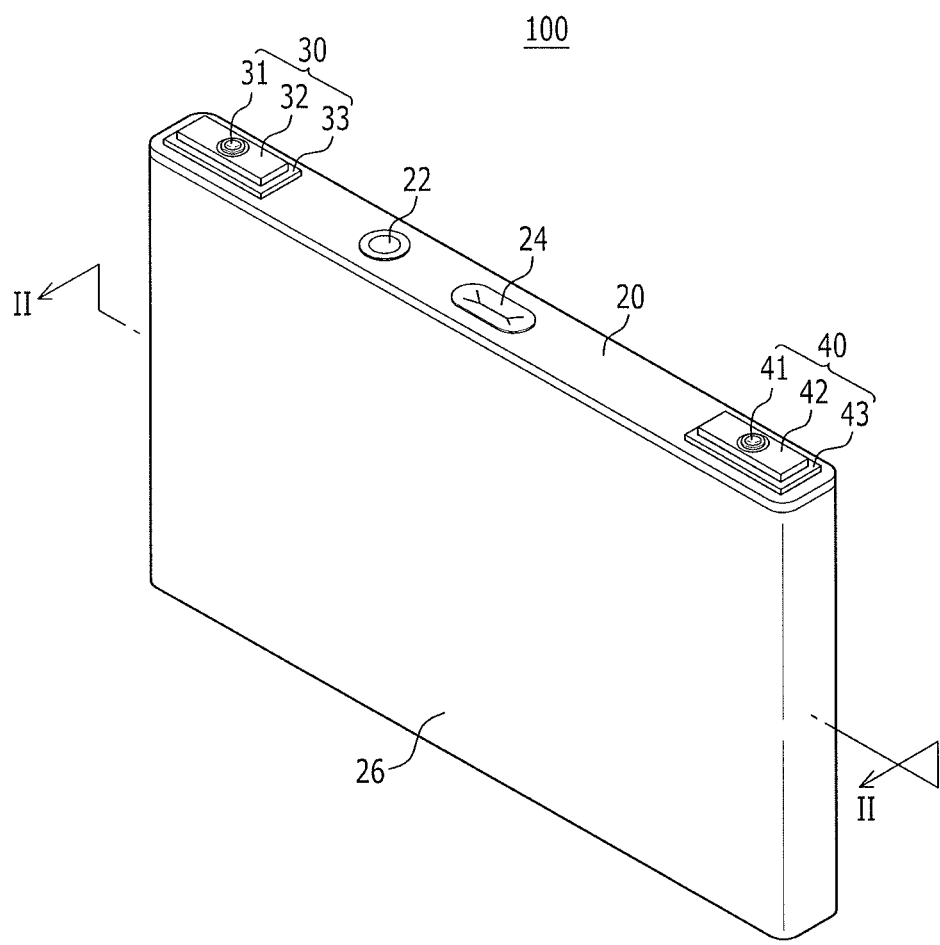
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 2:
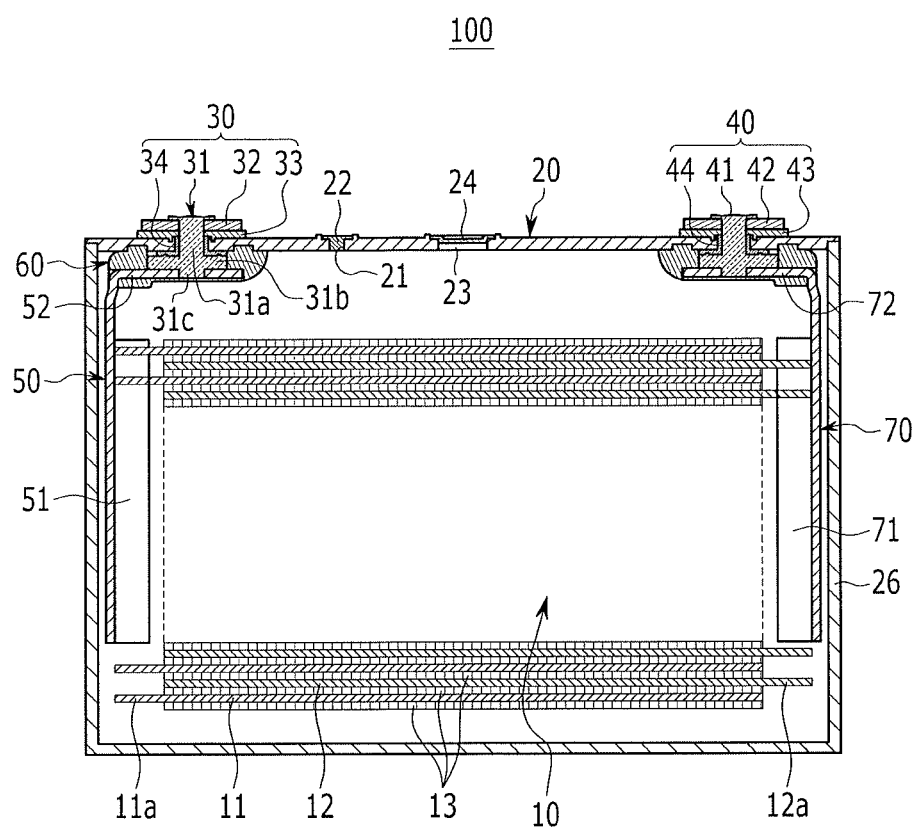
FIG. 2 illustrates a cross-sectional view taken along line II-II.

FIG. 1 is a perspective view illustrating a rechargeable battery according to an exemplary embodiment. FIG. 2 is a cross-sectional view taken along line II-II.

Referring to FIG. 1 and FIG. 2, the rechargeable battery 100 according to the present exemplary embodiment includes an electrode assembly 10 which is formed by winding a first electrode 11 and a second electrode 12 with a separator 13 interposed therebetween, a case 26 incorporating the electrode assembly 10, a first terminal portion 30 and a second terminal portion 40 that are electrically connected to the electrode assembly 10, a cap plate 20 that is coupled to an opening formed in the case 26, and first and second lower insulation members 60 and 80 that are mounted in the case 26.

As an example, the rechargeable battery 100 according to the present exemplary embodiment will be described as a prismatic lithium-ion rechargeable battery. However, the embodiments are not limited thereto, and the rechargeable battery according to the embodiment may be a lithium polymer battery, etc. The first electrode 11 may be a negative electrode and the second electrode 12 may be a positive electrode. On the contrary, the first electrode 11 may be a positive electrode and the second electrode 12 may be a negative electrode. For convenience of explanation herein, the terms "first electrode 11 and second electrode 12" will be used in the description in place of the terms "negative electrode and positive electrode".

The electrode assembly 10 may be formed in a jelly-roll shape by winding the first electrode 11, the second electrode 12, and the separator 13 together. Each of the first electrode 11 and the second electrode 12 may include a current collector formed of thin film metal foil and an active material coated on the surface of the current collector. The first electrode 11 and the second electrode 12 may also be partitioned into coated regions where the active material is coated on the current collector and a first electrode uncoated region 11a and a second electrode uncoated region 12a where the active material is not coated on the current collector. The coated regions form most of the first electrode 11 and second electrode 12 in the electrode assembly 10, and the first and second electrode uncoated regions 11a and 12a in the jelly-roll shape are disposed in the opposite end sides with respect to the coated regions.

However, the present embodiments are not limited thereto, and the aforementioned electrode assembly 10 may have a structure in which the first and second electrodes 11 and 12 including a plurality of sheets are laminated with the separator 13 interposed therebetween.

The first terminal portion 30 may be electrically connected to the first electrode uncoated region 11a of the electrode assembly 10 via a first electrode current collecting member 50, and the second terminal portion 40 may be electrically connected to the second electrode uncoated region 12a thereof via a second electrode current collecting member 70. Accordingly, the first terminal portion 30 may include a first electrode terminal, and the second terminal portion 40 may include a second electrode terminal.

The case 26 may have an approximately hexahedral shape, and an opening may be formed on one surface of the case 26. However, the present embodiments are not limited thereto, and the case may have various shapes including a cylindrical shape, a pouch shape, etc.

The cap plate 20 may be formed of a thin plate and coupled to the opening of the case 26 to close and seal the opening. The cap plate 20 may include an electrolyte injection opening 21 for injecting an electrolyte into the sealed case 26. The electrolyte injection opening 21 may be sealed with a sealing cap 22 after injection of the electrolyte. The cap plate 20 may have a vent hole 23 in which a vent plate 24, which is broken when the internal pressure of the sealed case 26 reaches a predetermined level, is mounted.

The first and second terminal portions 30 and 40 may include first and second rivets 31 and 41, first and second terminal plates 32 and 42, first and second terminal insulating members 33 and 43 mounted between the first and second terminal plates 32 and 42 and the cap plate 20, and first and second gaskets 34 and 44. The first and second rivet 31 and 41 may include first and second pole portions 31a and 41a, first and second flanges 31b and 41b, and first and second coupling protrusions 31c and 41c.

The first and second electrode current collecting members 50 and 70 include first and second electrode coupling portions 51 and 71 coupled to the first and second electrodes 11 and 12 and first and second terminal coupling portions 52 and 72 including first and second terminal coupling grooves 53 and 73 coupled to the first and second terminal portions 30 and 40.

The first and second lower insulation members 60 and 80 may be disposed to be adjacent to the cap plate 20 within the case 26.

Since the structure of the first terminal portion 30, first electrode current collecting member 50 and first lower insulating member 60 according to the present exemplary embodiment is virtually identical to or is a mirror image of the structure of the second terminal portion 40, second electrode current collecting member 70 and second lower insulation member 80, descriptions of the second terminal portion 40, second electrode current collecting member 70, and second lower insulation member 80 will not be repeated herein. Moreover, for convenience and enhanced readability, the term "first" will be omitted from the description of the first terminal portion 30, first electrode current collecting member 50, first lower insulating member 60, etc., and it is to be understood that first and second such structures may be present in the rechargeable battery. Also, for convenience, the electrode current collecting member 50 and the first electrode current collecting member coupling portion 61, described below, will be referred to as the "current collecting member 50" and the "current collecting member coupling portion 61," respectively. Also, hereinafter, the lower insulation member will be referred to as the "insulation member."

The terminal portion 30 according to the present exemplary embodiment may include a terminal (not shown) having a cylindrical shape, instead of a plate type terminal.

Figure 3:
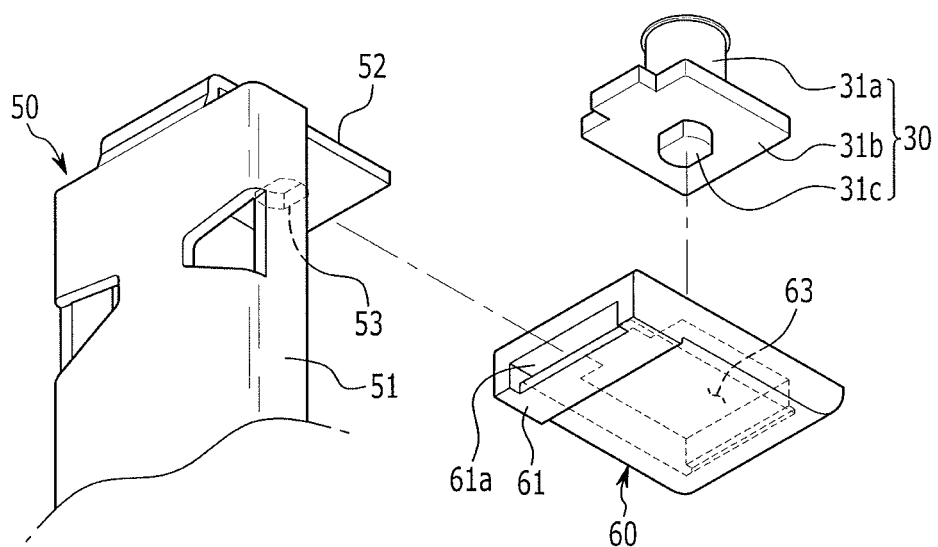
FIG. 3 illustrates a partial exploded perspective view of the rechargeable battery according to the exemplary embodiment of FIGS. 1 and 2.
Figure 4:
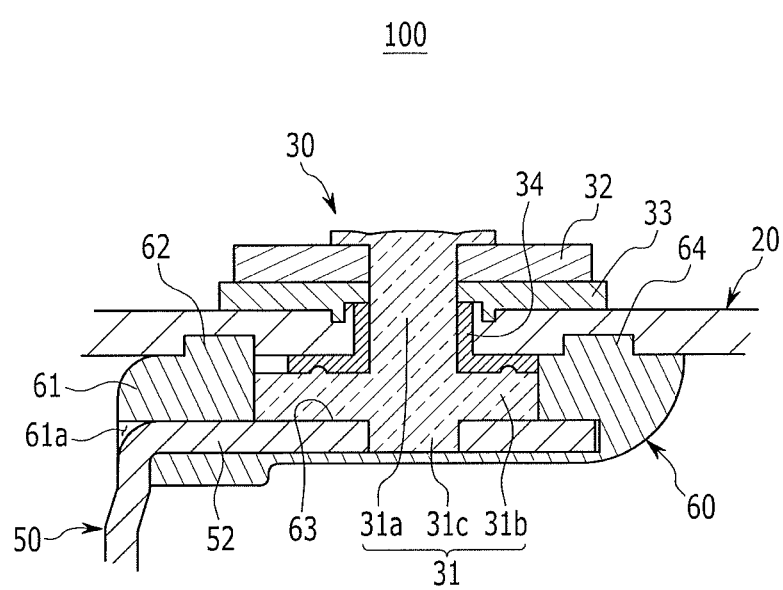
FIG. 4 illustrates a partial cross-sectional view of a coupled state of the rechargeable battery of FIG. 3.

FIG. 3 is a partial exploded perspective view of the rechargeable battery according to the exemplary embodiment of FIGS. 1 and 2. FIG. 4 is a partial cross-sectional view of a coupled state of the rechargeable battery of FIG. 3

Referring to FIG. 3 and FIG. 4, the rivet 31, electrode current collecting member 50, and insulation member 60 of the rechargeable battery 100 according to the present exemplary embodiment will be described in detail.

The insulation member 60 according to the present exemplary embodiment includes a current collecting member coupling portion 61, fixed protrusions 62 and 64 fixed to the cap plate 20, and a body portion adjacent to the current collecting member coupling portion. The body portion includes a fixed groove 63 to which the rivet 31 is fixed. The current collecting member coupling portion 61 has an opening 61a formed at one side thereof, and is formed on one surface of the insulation member 60 facing the electrode assembly 10.

The current collecting member 50 includes the electrode coupling portion 51, coupled to the electrode 11, and the terminal coupling portion 52.

Accordingly, as shown in FIG. 4, the terminal coupling portion 52 of the current collecting member 50 may be inserted into the current collecting member coupling portion 61 via the opening 61a, and fixed to the insulation member 60. The current collecting member coupling portion 61 may thereby support and stabilize at least a portion of the terminal coupling portion 52 of the current collecting member 50.

The width of the opening 61a of the electrode current collecting member coupling portion 61 may be equal to or greater than the width of the electrode current collecting member 50.

The flange 31b extending from the pole portion 31a of the rivet 31 may be inserted into the fixed groove 63 formed in the insulation member 60, and may be fixed to the insulation member 60.

At this point, the coupling protrusion 31c formed below the flange 31b may be inserted and fixed into the terminal coupling groove 53 of the terminal coupling portion 52. The coupling protrusion 31c and the terminal coupling groove 53 may be joined together by welding. Alternatively, the coupling protrusion 31c may be coupled to the terminal coupling groove 53 by force-fitting.

Moreover, the pole portion 31a may be riveted to the terminal plate 32. The terminal insulating member 33 may be disposed between the terminal plate 32 and the cap plate 20 to insulate the terminal portion 30 and the cap plate 20.

As a result, the terminal coupling portion 52 of the current collecting member 50 may be inserted and fixed into the electrode current collecting member coupling portion 61 of the insulation member 60, and the rivet 31 may be coupled and fixed to the terminal coupling portion 52.

Therefore, according to the present exemplary embodiment, the rechargeable battery 100 may be assembled with the rivet 31, current collecting member 50, and insulation member 60 coupled together, in contrast to the rechargeable battery 100 assembled with the rivet 31, current collecting member 50, and insulation member 60 separated from each other. Thus, it is possible to simplify the entire manufacturing process of the rechargeable battery 100 and improve the productivity of the rechargeable battery 100.

In addition, as the terminal coupling portion 52 of the current collecting member 50 is fixed by the insulation member 60, this enables the insulation member 60 to primarily absorb an impact from outside the rechargeable battery 100 and prevent damage to the current collecting member 50.

Figure 5:
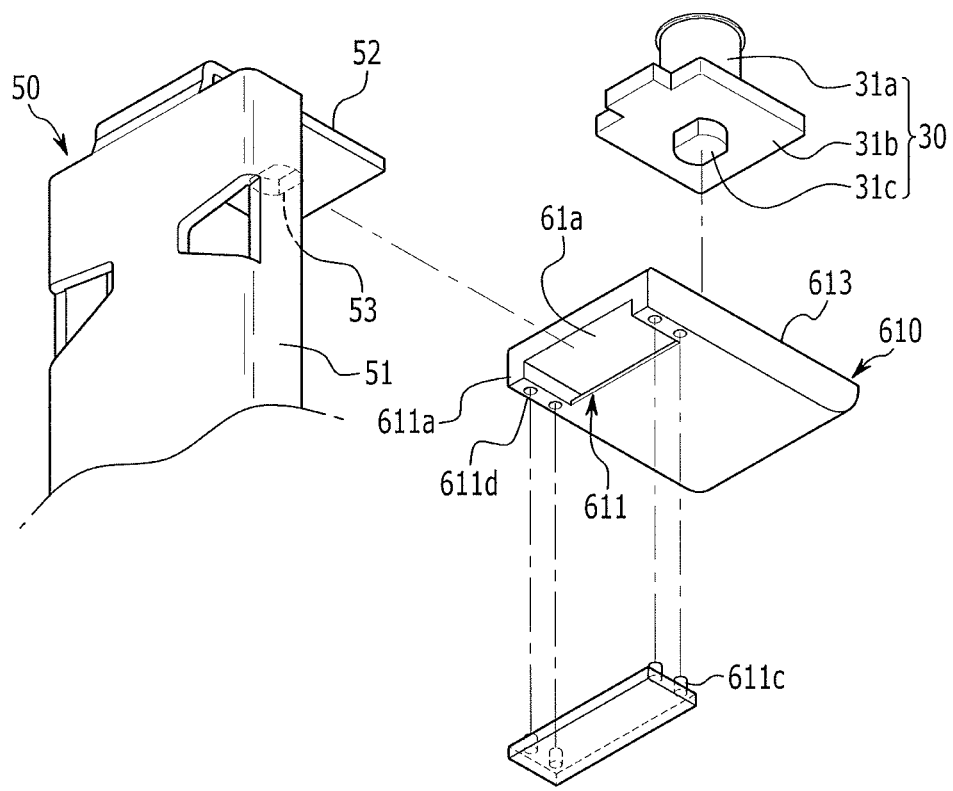
FIG. 5 illustrates a partial exploded perspective view according to a modified example of the exemplary embodiment of FIGS. 1 to 4.

FIG. 5 is a partial exploded perspective view according to a modified example.

Referring to FIG. 5, the rechargeable battery 101 according to the present exemplary embodiment has the same structure as the rechargeable battery 100 according to the FIGS. 1 to 4, except for differences regarding the insulation member 610, so description of the same structures will not be repeated.

The insulation member 610 will be described in more detail with reference to FIG. 5. The insulation member 610 according to the present exemplary embodiment includes a electrode current collecting member coupling portion 611 formed on one surface of the insulation member 610 facing the electrode assembly 10, a fixed groove 613 to which the rivet 31 is fixed, and fixed protrusions (not shown).

Moreover, the current collecting member coupling portion 611 includes an opening 611a formed at one side thereof and a plate 611b that forms a bottom surface of the current collector coupling portion 611. The plate 611b may include a plurality of protrusions 611c and is removable from the current collecting member coupling portion 611. The current collecting member coupling portion 611 may include a plurality of holes 611d into which the plurality of protrusions 611c formed on the plate 611b can be force-fit. Therefore, according to the present exemplary embodiment, the current collecting member coupling portion 611 may have a structure from which the plate 611b can be removed. Thus, the plate 611b can be coupled to the current collecting member coupling portion 611 after inserting the current collecting member 50 therein.

As a result, according to the present exemplary embodiment, it is possible to easily couple the current collecting member 50 to the current collecting member coupling portion 611. Accordingly, the manufacturing of the rechargeable battery 101 can be improved and current collecting member 50 may be protected from external impacts.

Figure 6:
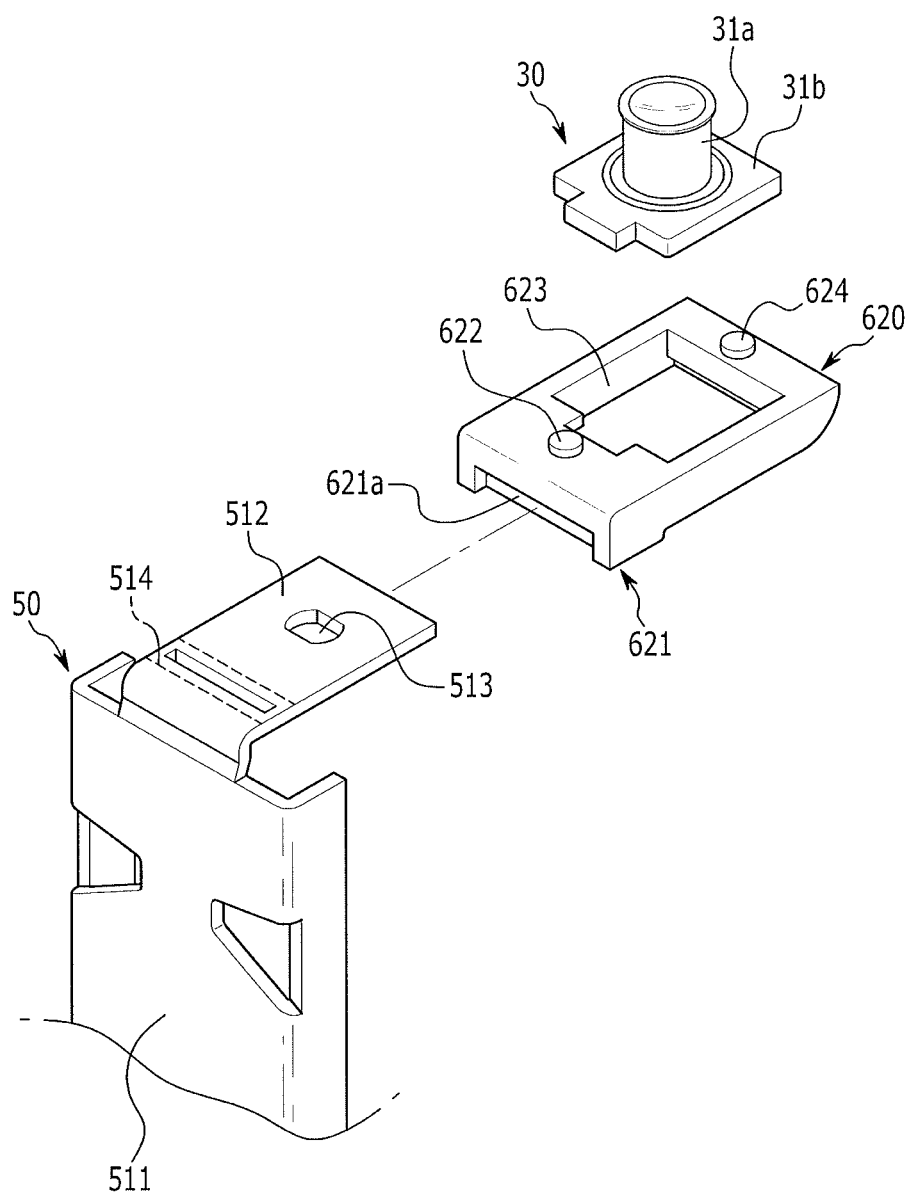
FIG. 6 illustrates a partial exploded perspective view of a rechargeable battery according to another exemplary embodiment.
Figure 7:
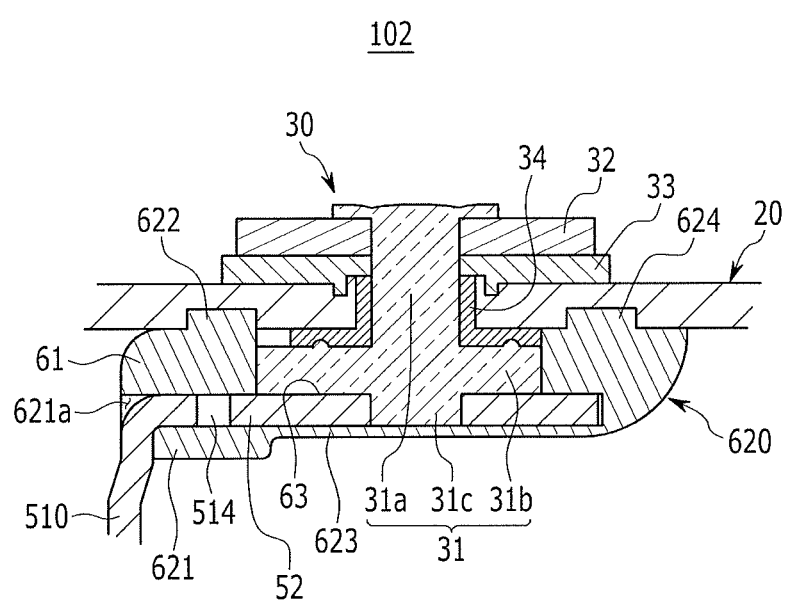
FIG. 7 illustrates a partial cross-sectional view of a coupled state of the rechargeable battery of FIG. 6.

FIG. 6 is a partial exploded perspective view of a rechargeable battery according to another exemplary embodiment. FIG. 7 is a partial cross-sectional view of a coupled state of the rechargeable battery of FIG. 6.

Referring to FIG. 6 and FIG. 7, the rechargeable battery 102 according to the present exemplary embodiment has the same structure as the rechargeable battery 100 according to the exemplary embodiment of FIGS. 1 to 4, except for differences regarding the current collecting member 510 and the insulation member 620, so description of the same structures will not be repeated.

The rechargeable battery 102 according to the present exemplary embodiment will be described in more detail with reference to FIGS. 6 and 7. The current collecting member 510 includes a electrode coupling portion 511 and a terminal coupling portion 512.

The terminal coupling portion 512 includes a terminal coupling groove 513 to be coupled to the coupling protrusion 31c of the rivet 31 and a fuse portion 514 including a fuse hole.

The insulation member 620 according to the present exemplary embodiment includes a current collecting member coupling portion 621 formed on one surface of the insulation member 620 facing the electrode assembly 10, a fixed groove 623 to which the rivet 31 is fixed, and fixed protrusions 622 and 624.

As shown in FIG. 7, the terminal coupling portion 512 of the current collecting member 510 may be inserted into the current collecting member coupling portion 621 via an opening 621a of the current collecting member coupling portion 621, and fixed to the insulation member 620.

Since a region where the fuse portion 514 is formed includes the fuse hole, this region has a smaller cross-sectional area than other regions of the terminal coupling portion 512. Accordingly, more current flows in the rechargeable battery than in other regions when overcurrent flows in the rechargeable battery, and hence the rechargeable battery may be fused. Therefore, electrical connection between the electrode assembly and the terminal portion 30 may be cut off.

However, there is a possibility of damage to the fuse portion 514 due to stress concentration on the fuse portion 514 caused by an external impact to the rechargeable battery 102 because the fuse portion 514 with the fuse hole has a smaller cross-sectional area than other regions of the terminal coupling portion 512.

Accordingly, as in the present exemplary embodiment, if the terminal coupling portion 512 including the fuse portion 514 with the fuse hole is coupled to the current collecting member coupling portion 621 of the insulation member 620, the fuse portion 514 can be prevented from damage due to an impact from outside the rechargeable battery 102.

Moreover, the fuse portion 514 is supported by the current collecting member coupling portion 621. Thus, it is unnecessary to limit the size of the fuse hole of the fuse portion 514 to a range within which the fuse portion 514 is not damaged. Hence, it is possible to increase the degree of design freedom of the fuse portion 514.

Figure 8:
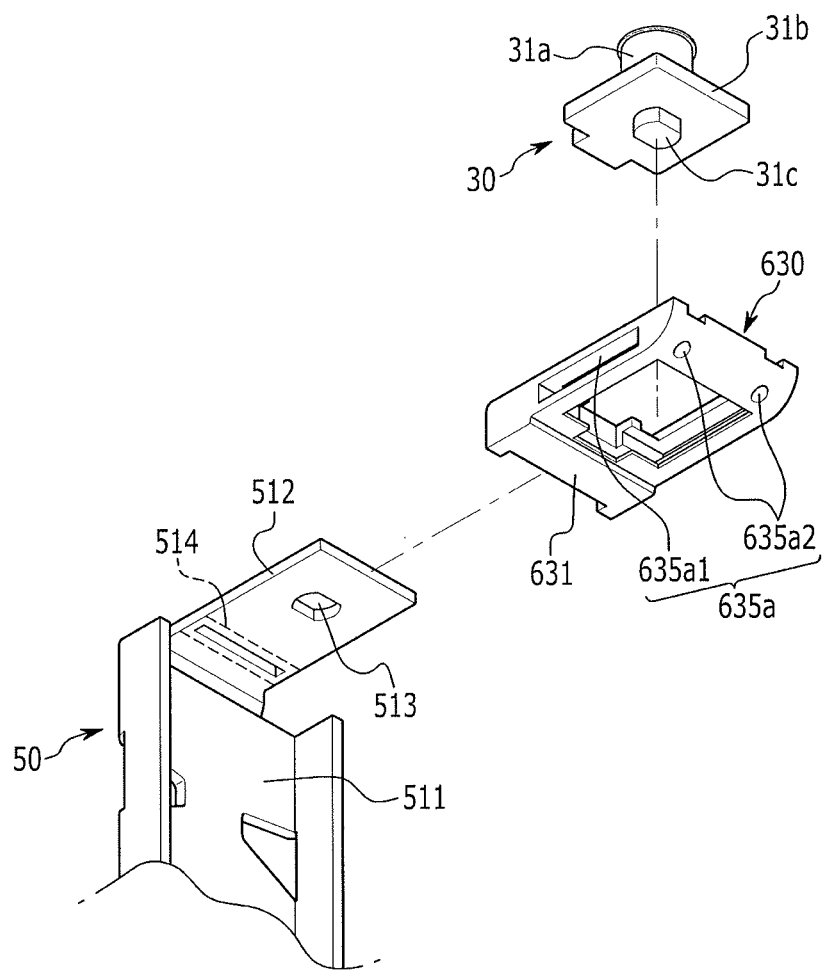
FIG. 8 illustrates a partial exploded perspective view of a rechargeable battery according to another exemplary embodiment.
Figure 9:
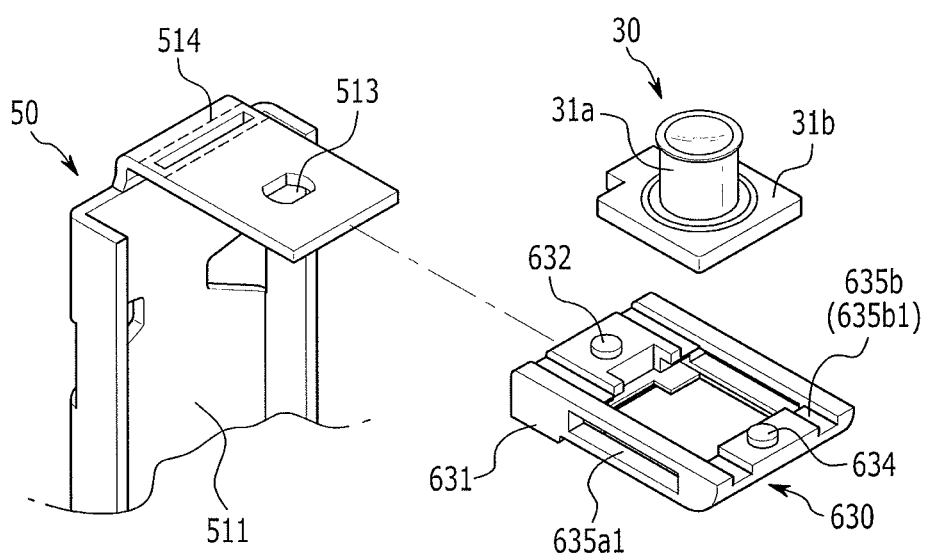
FIG. 9 illustrates a partial exploded perspective view of the rechargeable battery according to the exemplary embodiment of FIG. 8.

FIGS. 8 and 9 are partial exploded perspective views of a rechargeable battery according to another exemplary embodiment.

Referring to FIG. 8, the rechargeable battery 103 according to the present exemplary embodiment has the same structure as the rechargeable battery 102 according to the exemplary embodiment of FIGS. 6 and 7, except for differences regarding the insulation member 630, so description of the same structures will not be repeated.

The insulation member 630 will be described in more detail with reference to FIG. 8. The insulation member 630 according to the present exemplary embodiment includes a current collecting member coupling portion 631 having an opening (not shown) formed at one side thereof, and formed on one surface of the insulation member 630 facing the electrode assembly 10, body portion including a fixed groove (not shown) to which the rivet 31 is fixed, fixed protrusions (not shown), and a gas exhaust 635.

The gas exhaust 635 may include a first gas exhaust flow path 635a extending from a side of the insulation member 630 to one end thereof and a second gas exhaust flow path 635b formed on one surface of the insulation member 630 facing the cap plate 20.

More specifically, the first gas exhaust flow path 635a may include a gas exhaust passage 635a1 and a gas exhaust port 635a2. The gas exhaust passage 635a1 extends from one side end of the current collecting member coupling portion 631 to one side end of the insulation member 630. For example, the gas exhaust passage 635a1 may extend along a lateral side of the lower insulating member 630. The gas exhaust port 635a2 is formed at a position facing the gas exhaust passage 635a1 at one side end of the insulation member 630, and connected to the gas exhaust passage 635a1. A pair of first gas exhaust flow paths 635a may be formed at two lateral sides of the insulation member 630.

Moreover, the second gas exhaust flow path 635b may include a gas exhaust slot 635b1 formed on an upper surface of the insulation member 630, which may be a surface of the insulation member 630 facing the cap plate 20. The gas exhaust slot 635b1 may extend from one end of the insulation member 630 to the other end thereof. Accordingly, when the insulation member 630 is coupled to the cap plate 20, a gap created by the gas exhaust slot 635b1 may be formed between the insulation member 630 and the cap plate 20. The second gas exhaust flow path 635b according to the present exemplary embodiment may include a pair of gas exhaust slots positioned on opposite sides.

As a result, a space into which gas produced in the rechargeable battery 103 can move may be formed by the first and second gas exhaust flow paths 635a and 635b according to the present exemplary embodiment.

The function of the gas exhaust 635 according to the present exemplary embodiment will be described in more detail with reference again to FIG. 2. The gas produced between the case 26 and the insulation member 630 may be guided to flow to a region where the vent hole 23 is positioned via the first and second gas exhaust flow paths 635a and 635b of the insulation member 630.

The gas produced between the case 26 and the insulation member 630 is stopped by the insulation member 630 and accumulated between the case 26 and the insulation member 630, thereby preventing the formation of turbulence that may be caused by collision with the insulation member 630. Consequently, the gas exhaust 635 according to the present exemplary embodiment functions to maintain constant the internal pressure of the rechargeable battery 103 caused by the gas.

Further, if overcurrent flows in the fuse portion 514 having a smaller cross-sectional area than other regions of the terminal coupling portion 512, the fuse portion 514 may be fused and gas may be produced in the insulation member 630. The gas produced by the fusion of the fuse portion 514 may pass through the gas exhaust passage 635a1 of the first gas exhaust flow path 635a, and be exhausted out of the insulation member 630 via the gas exhaust port 635a2.

Accordingly, it is possible to prevent the gas from being accumulated in the insulation member 630 despite the fusion of the fuse portion 514, thus preventing degradation of the performance of the fuse portion 514.

However, the present embodiments are not limited thereto, and only one first gas exhaust flow path 635a and only one second gas exhaust flow path 635b may be formed at the insulation member 630.

In addition, the gas exhaust 635 according to the present exemplary embodiment is not limited to the first and second gas exhaust flow paths 635a and 635b, provided that the gas exhaust 635 has a structure in which the gas produced in the rechargeable battery 103 can be exhausted. For example, the gas exhaust 635 also may be formed on one surface of the insulation member 630 facing the electrode assembly 10.

By way of summation and review, if a rechargeable battery is formed with a large number of components coupled together, a large amount of labor is required to couple these components together. This may lead to deterioration in productivity in the manufacturing process.

Moreover, when the rechargeable battery receives an external impact, or is repeatedly recharged and discharged, an electrode current collecting member for electrically connecting an electrode terminal and an electrode assembly may be damaged.

In addition, gas produced in the rechargeable battery due to operation of the rechargeable battery may accumulate at a portion of the rechargeable battery, and thus, the internal gas pressure of the rechargeable battery may not be not kept constant.

By contrast, a rechargeable battery according to present embodiments may offer improved manufacturing productivity and prevention of damage to an electrode current collecting member by providing a insulation member for coupling components together as one unit. In more detail, the manufacturing productivity of the rechargeable battery may be improved by simplifying the operation process, and the electrode current collecting member can be prevented from being easily damaged due to an external impact due to the presence of the insulation member for coupling the electrode current collecting member thereto. The insulation member may also have a structure capable of keeping the internal gas pressure of a rechargeable battery constant.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A rechargeable battery, comprising:
a case;
an electrode assembly in the case;
at least one terminal portion disposed at least partially inside the case;
at least one current collecting member electrically connecting the electrode assembly and the terminal portion, the current collecting member including a terminal coupling portion including a fuse portion; and
at least one insulation member in the case, wherein:
the at least one insulation member includes a current collecting member coupling portion into which the terminal coupling portion extends, the current collecting member coupling portion including a first surface over the terminal coupling portion and a second surface under the terminal coupling portion, the terminal coupling portion located in an opening between the first and second surfaces such that the first and second surfaces of the current collecting member coupling portion support at least the fuse portion of the terminal coupling portion, the fuse portion has a smaller cross-sectional area than other portions of the terminal coupling portion, and includes a fuse hole, and
the insulation member includes a body portion adjacent to the current collecting member coupling portion, and includes a plurality of gas exhaust paths, wherein
the plurality of gas exhaust paths include a gas exhaust port located on a first lateral side of the insulation member, the gas exhaust being not parallel to the terminal coupling portion, wherein
the first lateral side of the insulation member is opposite to the current collecting member coupling portion.

2. The rechargeable battery as claimed in claim 1, wherein the body portion includes a groove in which the terminal coupling portion is received.

3. The rechargeable battery as claimed in claim 2, wherein the terminal portion engages the terminal coupling portion of the current collecting member inside the groove.

4. The rechargeable battery as claimed in claim 2, wherein the current collecting member coupling portion includes an opening between the groove and an outside of the insulation member, and through which the terminal coupling portion insertably extends.

5. The rechargeable battery as claimed in claim 2, wherein:
a boundary of the groove has a predetermined shape; and
the terminal portion includes a flange having a perimeter with a shape corresponding to the predetermined shape of the boundary of the groove, the flange being in insertable engagement with the groove.

6. The rechargeable battery as claimed in claim 1, wherein the terminal coupling portion includes a terminal coupling hole that engages a coupling protrusion extending from the terminal portion.

7. The rechargeable battery as claimed in claim 2, wherein the current collecting member coupling portion is coupled to a plate that forms a bottom surface of the current collecting member coupling portion of the insulation member.

8. The rechargeable battery as claimed in claim 7, wherein the current collecting member coupling portion and the plate are coupled by force-fit engagement of corresponding projections and holes on the current collecting member coupling portion and the plate.

9. The rechargeable battery as claimed in claim 1, wherein the gas exhaust paths further include a first gas exhaust flow path on a second lateral side of the insulation member.

10. The rechargeable battery as claimed in claim 1, wherein the gas exhaust paths further include a pair of first gas exhaust flow paths on a pair of second lateral sides of the insulation member.

11. The rechargeable battery as claimed in claim 1, wherein the gas exhaust paths further include a second gas exhaust flow path at an upper surface of the insulating member, the second gas exhaust flow path including one or more gas flow slots that extend across the upper surface of the insulating member.

12. The rechargeable battery as claimed in claim 1, wherein:
the at least one terminal portion includes first and second terminal portions;
the at least one current collecting member includes first and second current collecting members; and
the at least one insulation member includes first and second insulation members.

13. A current collector-terminal assembly comprising:
a current collecting member including an electrode coupling portion and a terminal coupling portion including a fuse portion;

a terminal member; and an insulation member including a current collecting member coupling portion into which the terminal coupling portion extends, the current collecting member coupling portion including a first surface over the terminal coupling portion and a second surface under the terminal coupling portion, the terminal coupling portion located in an opening between the first and second surfaces such that the first and second surfaces of the current collecting member coupling portion support at least the fuse portion of the terminal coupling portion, the insulation member including a body portion having a groove in which the current collecting member coupling portion is received, wherein:

the terminal coupling portion is insertably received in an opening of the enclosure of the current collecting member coupling portion of the insulation member and extends into the groove, the terminal member is fixed in the groove such that the terminal member engages the terminal coupling portion, the fuse portion has a smaller cross-sectional area than other portions of the terminal coupling portion, and includes a fuse hole, and the insulation member includes a body portion adjacent to the current collecting member coupling portion, and includes a plurality of gas exhaust paths, wherein the plurality of gas exhaust paths include a gas exhaust port located on a first lateral side of the insulation member, the gas exhaust port being not parallel to the terminal coupling portion, wherein the first lateral side of the insulation member is opposite to the current collecting member coupling portion.

14. The current collector-terminal assembly as claimed in claim 13, wherein the insulation member includes at least one of a first gas exhaust flow path on a second lateral side of the insulation member and a second gas exhaust flow path at a upper surface of the insulating member, the second gas exhaust flow path including one or more gas flow slots that extend across the upper surface of the insulating member.

* * * * *